March 31, 1964    F. J. GROSS    3,126,614
METHOD OF BEARING ALIGNMENT
Filed Aug. 29, 1961
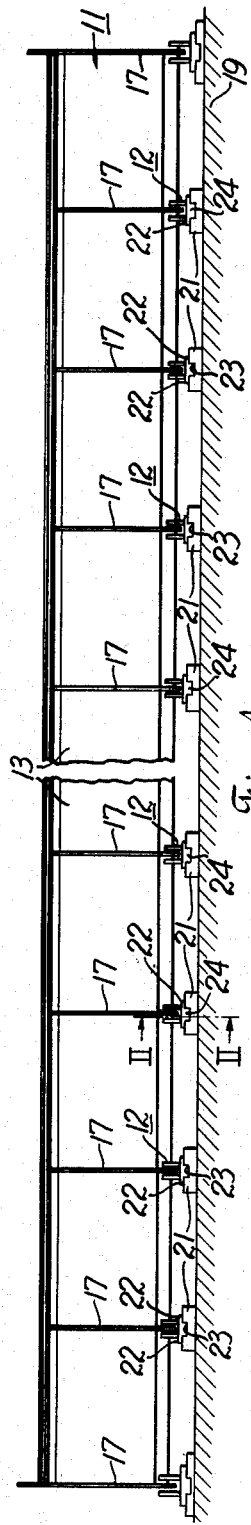
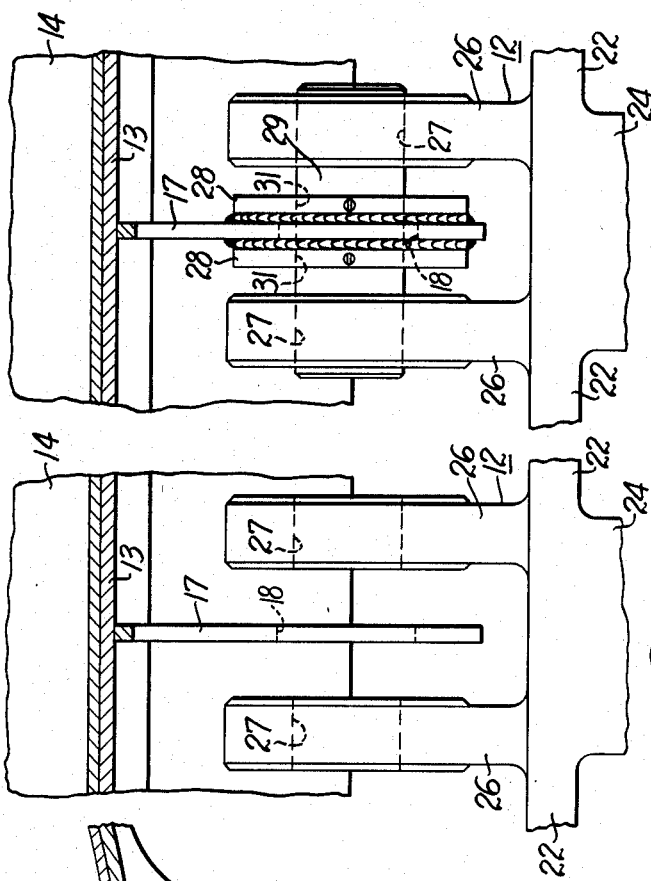
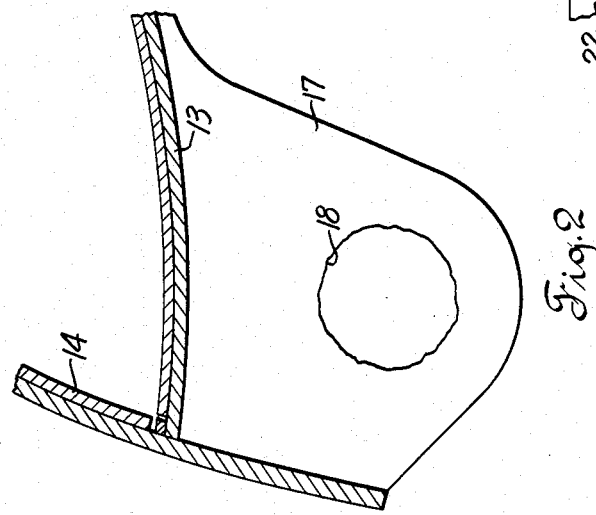
Inventor
Frank J. Gross
By John P. Hines
Attorney United States Patent Office 3,126,614
Patented Mar. 31, 1964

3,126,614
METHOD OF BEARING ALIGNMENT
Frank J. Gross, York, Pa., assignor to Allis-Chalmers Manufacturing Company, Milwaukee, Wis.
Filed Aug. 29, 1961, Ser. No. 134,756
2 Claims. (Cl. 29—149.5)

This invention pertains to a method of aligning and pivotally attaching a crest gate to its supporting bearings.

With the ever increasing demand for electrical power, utility companies employing hydraulic turbines are finding it more and more necessary to conserve water to drive the turbines. One relatively simple and inexpensive manner of increasing water storage is to provide a gate across the top of the dam thereby increasing the amount of back water available to drive the turbines as well as for municipal water supply. Although the attachment of a crest gate to the top of a dam is a relatively simple project, certain problems do exist. Gates ranging in length up to 800 feet varying from two to eighteen feet damming height have been used. Since the gate must be pivoted to the top of the dam, it can be seen that the means of attaching the gate to the dam must be extremely accurate and free of excessive binding so that only a reasonable force is required to pivot the gate.

Because of the length and weight involved, a large number of pivot points are required. So that excessive binding does not result, it is necessary that these pivot points or journals be accurately aligned. It is a relatively simple matter to level and accurately align the journal bearings to the top of the dam. On the other hand, it is considerably difficult to provide the bearing bores in the crest gate so they will be accurately aligned and congruent with the axis of rotation. One method of providing an accurately aligned pivot connection is to align the gate to the journal bearings and line bore the bearing pads on the gate while the gate is held in the required position. However, it is readily discernible that it would be an extremely difficult and expensive operation to line bore a gate having a length of over 500 feet.

It is, therefore, a general object of the subject invention to provide a simple and inexpensive method of bearing alignment for crest gates.

A more specific object of the invention is to provide a method of bearing alignment for a crest gate wherein the crest gate is roughly aligned with the supporting journal bearings and the fine alignment is subsequently provided by attaching the gate bearing pads to the gate after they are critically aligned with the journal bearings.

These and other objects of the subject invention will become more fully apparent as the following description is read in light of the attached drawings wherein:

FIG. 1 is a front elevation of a crest gate roughly aligned with its supporting journal bearings;

FIG. 2 is a cross sectional view of a portion of the crest gate showing a rough aligning hole taken along the lines II—II of FIG. 1;

FIG. 3 is an enlarged view of a portion of the crest gate roughly aligned with a supporting journal bearing; and FIG. 4 is an enlarged view of a portion of the crest gate after it has been finally and critically aligned and is supported by the journal bearings.

Referring to the drawings, a crest gate generally designated 11 is shown positioned for pivotal attachment to a series of longitudinally spaced and aligned journal bearings designated 12. The gate itself may be constructed in any conventional manner and is herein shown as having a curved backbone 13 and a lesser curved front portion 14 fabricated from steel plate. Protuberances or mounting flanges 17 may be an integral part of the gate 11 and are spaced to coincide with the spacing of journal bearings 12.

It is intended that the gate 11 will be supported on journal bearings by means of pins which are attached to the mounting flanges 17. Therefore, in accordance with the invention, an oversized hole 18 is provided through each flange 17. These holes may be provided in any manner and are herein shown as having been cut with a torch.

The crest gate 11 is intended to be attached to the top of a dam or any other gate support 19 and for this purpose a series of bearing support blocks 21 may be provided. It is necessary that the bearing support blocks be level and accurately aligned and spaced. The journal bearings 12 may be removably attached to each bearing support block 21 in any conventional manner such as with bolts (not shown) through the flanges 22. To provide additional lateral support to the journal bearings, the bearing support blocks 21 may be provided with a groove 23 into which a tongue 24 of the journal bearing 12 is received. Each journal bearing 12 may be provided with two spaced and upright support members 26 which are provided with accurately aligned pin receiving bores 27. These bores may be provided with any conventional bearing surface such as bronze bushings.

It is a relatively simple matter with the optical equipment now available to attach the support blocks 21 to the top of the dam 19 and to connect the journal bearings 12 thereto so that they are very accurately aligned with one another. However, it is a practical impossibility to accurately bore the support flanges 17 with pin receiving holes and then accurately attach them to the crest gate. It might be possible to provide the pin receiving bores after the support flanges have been aligned to the gate, however, such a line boring operation would require an excessively large and expensive machine and the boring operation would be extremely difficult to accomplish.

Applicant's method of assembling the crest gate to the support bearings is extremely inexpensive when compared to line boring and yet is equally if not more accurate. The support members 26 are attached to any level foundation such as the erection floor of the fabricator and accurately aligned with well known optical equipment. The crest gate is then lowered into position and leveled as shown in FIG. 3. The oversized holes 18 are roughly aligned with the bearing bores 27 in the support bearings. One or two bearing pads 28 are then positioned on the side of the support flange 17 and a pin 29 is passed through the support bearing bores 27 and bores 31 provided in each bearing pad. In this manner the bearing pads are accurately aligned with the journal bearings. It should be pointed out that if two bearing pads are to be used they should be accurately bored in pairs. The bearing pads are then attached to the support flange 17 in any conventional manner such as by welding as shown in FIG. 4. In most cases it will be found advantageous to tack weld the pads 28 while they are positioned near the support bearings 12 as an excessive amount of heat may result in misalignment of the journal bearings. After the pads are tack welded to the support flange 17, the pin 29 is removed and the pads 28 are then completely welded to the support flange 17 and the gate is then ready to be shipped to the dam site and attached to the top of the dam.

Although only one embodiment of the subject invention has been shown and described, it will be apparent to those skilled in the art that other modifications may be made therein without departing from the spirit of the invention or from the scope of the appended claims.

Having now particularly described and ascertained the nature of my said invention and the manner in which it is to be performed, I declare that what I claim is:

1. A method of pivotally connecting a gate structure having a multiple of spaced gate supporting flanges to support members by means of pivot pins and bearing pads comprising: rigidly connecting said support members to a gate support at spaced intervals equal to the spacing of said flanges so as to accurately align pin receiving orifices in each support member; providing roughly aligned through holes in said flanges, said through holes having a diameter larger than the diameter of said pins; positioning said gate so that each through hole is in rough alignment with and adjacent a support member orifice; positioning a bearing pad having a pin receiving opening therethrough adjacent to each of said flanges in rough alignment with said through holes; inserting a pivot pin through each of said support member orifices and the associated bearing pad opening to thereby align said bearing pad openings with said support member orifices; and rigidly connecting said bearing pads to said flanges when said pins are in place.

2. In a gate structure having a multiple of spaced gate supporting flanges the method of providing bearing bores in said flanges for pivotal attachment to journal bearings by means of pivot pins and bearing pads comprising: accurately aligning and rigidly connecting said journal bearings to a gate support at spaced intervals equal to the spacing of said flanges; providing roughly aligned through holes in said flanges, said through holes having a diameter larger than the diameter of said pins; positioning said gate with said through holes in rough alignment with and adjacent said journal bearings; positioning a bearing pad adjacent to each of said flanges so that pin receiving openings therein are in rough alignment with said holes; inserting a pivot pin through each journal bearing and the associated bearing pad to thereby align said bearing pad openings with said journal bearings; lightly connecting said bearing pads to said flanges when said pins are in place; removing said pins; and rigidly connecting said bearing pads to said flanges.

References Cited in the file of this patent

UNITED STATES PATENTS

| | | |
|---|---|---|
| 1,109,094 | Weckbaugh | Sept. 1, 1914 |
| 1,498,769 | Wood | June 24, 1924 |